(12) United States Patent
Avitan et al.

(10) Patent No.: US 8,466,712 B1
(45) Date of Patent: Jun. 18, 2013

(54) DIRECT CURRENT (DC) COUPLING WITH RAIL TO RAIL COMMON MODE

(75) Inventors: Shimon Avitan, Kiryat Ata (IL); Liav Ben Artsi, Nahariya (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 2 days.

(21) Appl. No.: 12/987,770

(22) Filed: Jan. 10, 2011

Related U.S. Application Data

(60) Provisional application No. 61/294,012, filed on Jan. 11, 2010, provisional application No. 61/317,203, filed on Mar. 24, 2010.

(51) Int. Cl.
*H03K 19/086* (2006.01)

(52) U.S. Cl.
USPC .......................................... 326/127; 326/115

(58) Field of Classification Search
None
See application file for complete search history.

(56) References Cited

U.S. PATENT DOCUMENTS

| | | | |
|---|---|---|---|
| 5,155,386 A * | 10/1992 | Abdi | 327/67 |
| 5,528,172 A * | 6/1996 | Sundstrom | 326/80 |
| 6,249,557 B1 * | 6/2001 | Takatori et al. | 375/355 |
| 7,564,270 B1 * | 7/2009 | Zhang et al. | 326/127 |
| 2006/0067396 A1* | 3/2006 | Christensen | 375/232 |

* cited by examiner

*Primary Examiner* — Crystal L Hammond

(57) ABSTRACT

Embodiments of the present disclosure provide an integrated circuit, comprising a first feed forward equalizing (FFE) circuit configured to operate based on receipt of a first common mode voltage; a second FFE circuit coupled to the first FFE circuit, the second FFE circuit configured to operate based on receipt of a second common mode voltage that is different than the first common mode voltage; and a decision circuit coupled to both the first FFE circuit and the second FFE circuit, the decision circuit configured to selectively provide the first common mode voltage to the first FFE circuit or the second common mode voltage to the second FFE circuit.

20 Claims, 3 Drawing Sheets

DIRECT CURRENT (DC) COUPLING WITH RAIL TO RAIL COMMON MODE

CROSS REFERENCE TO RELATED APPLICATIONS

This Application claims priority to U.S. Provisional Patent Application No. 61/294,012, filed on Jan. 11, 2010, and to U.S. Provisional Patent Application No. 61/317,203, filed on Mar. 24, 2010, the entire specifications of which are hereby incorporated by reference, except for those sections, if any, that are inconsistent with this disclosure.

TECHNICAL FIELD

Embodiments herein relate to the field of digital circuitry, and, more specifically, to circuitry configured to receive and adjust unknown common mode voltages.

BACKGROUND

The background provided herein is for the purpose of generally presenting the context of this disclosure. Work of the presently named inventor, to the extent it is described in this background section, as well as aspects of the description that may not otherwise qualify as prior art at the time of filing, are neither expressly nor impliedly admitted as prior art against the present disclosure.

Integrated circuits, described generally as drivers and receivers, are typically characterized by a common mode voltage. Generally, a common mode voltage is an average value of transmitted or received signals that comprise a differential signal. In various devices, a driver is associated with one common mode voltage while a receiver is associated with a different common mode voltage. A difference in the common mode voltage between the driver and the receiver causes various problems, such as, but not limited to, current surge and a direct current (DC) offset on the signal. These problems can impact the transmitted waveform and lower receiver sensitivity and tolerance. One cause for the difference in common mode voltages, for example, is due to the manufacture of the driver and receiver by different provider entities.

To mitigate interoperability issues, drivers and receivers are typically connected through a DC voltage blocking device, such as a serial capacitor for example. While achieving common mode voltage isolation between a driver and a receiver, DC voltage blocking devices can also cause several signal integrity, placement, and cost issues. Some devices require numerous DC voltage blocking devices, which tends to exacerbate these shortcomings.

SUMMARY

The present disclosure provides an integrated circuit, comprising a first feed forward equalizing (FFE) circuit configured to operate based on receipt of a first common mode voltage; a second FFE circuit coupled to the first FFE circuit, the second FFE circuit configured to operate based on receipt of a second common mode voltage that is different than the first common mode voltage; and a decision circuit coupled to both the first FFE circuit and the second FFE circuit, the decision circuit configured to selectively provide the first common mode voltage to the first FFE circuit or the second common mode voltage to the second FFE circuit.

There is also provided a method, comprising receiving, by an integrated circuit, a differential signal, wherein the differential signal has an unknown common mode voltage; determining, by the integrated circuit, the common mode voltage of the differential signal; and selectively activating, based on the determining by the integrated circuit, either a first feed forward equalizing (FFE) circuit associated with a first common mode voltage or a second FFE circuit associated with a second common mode voltage that is different than the first common mode voltage.

There is also provided a system, comprising a driver configured to transmit a differential signal, wherein the differential signal has a common mode voltage; and a receiver coupled to the driver, wherein the receiver is configured to determine the common mode voltage of the differential signal and provide the differential signal to one of a first feed forward equalizer (FFE) circuit or a second FFE circuit.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

In the following detailed description, reference is made to the accompanying drawings which form a part hereof, and in which are shown by way of illustration embodiments that are practiced. It is to be noted that other embodiments can be utilized and structural or logical changes can be made without departing from the scope. Therefore, the following detailed description is not to be taken in a limiting sense, and the scope of embodiments is defined by the appended claims and their equivalents.

Various operations can be described as multiple discrete operations in turn, in a manner that is helpful in understanding embodiments; however, the order of description should not be construed to imply that these operations are order dependent. Additionally, the description should not be construed to imply that all operations are necessary for all embodiments.

The description uses the terms "embodiment" or "embodiments," which each refer to one or more of the same or different embodiments. Furthermore, the terms "comprising," "including," "having," and the like, as used with respect to embodiments, are synonymous.

In various embodiments, a driver transmits a high speed differential signal to a receiver. In an embodiment, the driver and receiver are individual or separate integrated circuits directly coupled to each other by a trace. The driver and the receiver can operate at different common mode voltages, and consequently, each of the single ended signals that comprise the propagated differential signal can have an unknown common mode voltage at the receiver side. In order to avoid the need for direct current (DC) blockers, the receiver includes a decision circuit configured to determine and maintain either a first common mode voltage or a second common mode voltage, and provide the maintained common mode voltage and signal to a circuit configured for the common mode voltage. In this manner, the receiver is configured to receive an unknown common mode voltage and adapt its function to accept the unknown common mode voltage. Thus, the receiver is compatible with a plurality of drivers regardless of the common mode voltages that characterize the drivers.

Figure 1:
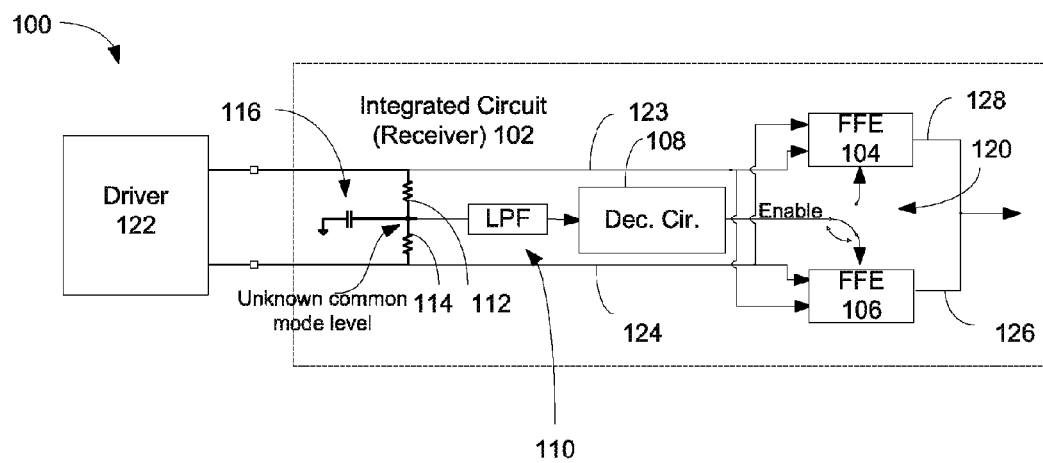
FIG. 1 illustrates a block diagram of a variable common mode system, in accordance with various embodiments.

Referring to FIG. 1, a system 100 is illustrated in accordance with various embodiments. The system 100 includes a first integrated circuit, such as driver 122, coupled to a second integrated circuit, such as receiver 102. The receiver 102 further includes a first feed forward equalizer (FFE) circuit 104 having output 128, a second FFE circuit 106 having output 126, a decision circuit 108, a low pass filter 110, termination resistors 112 and 114, and an electromagnetic interference (EMI) capacitor 116. While the receiver 102 is illustrated as receiving the differential signal over signal lines 123 and 124 from the driver 122, those of ordinary skill in the art will understand that the disclosure is not so limited. For example, the receiver 102 receives a signal from other sources than driver 122.

The driver 122 is an integrated circuit configured to propagate a differential signal over traces 123 and 124 having a common mode voltage. Differential signaling is a method of transmitting information electrically by means of two complementary signals sent on two separate wires or traces. The average of the two complementary signals is defined as the common mode. The driver 122 can be characterized by a common mode voltage that is high or low relative to the power rails of the device. The determination of a high common mode voltage or a low common mode voltage is made with respect to a threshold voltage predetermined for the system.

The receiver 102, coupled to the driver 122, is configured to determine the common mode voltage of the differential signal and to provide the differential signal to one of either the first FFE circuit 104 or the second FFE circuit 106. The first and second FFE circuits 104 and 106 comprise a plurality of transistors. In one embodiment, the first FFE circuit 104 includes N-type transistors while the second FFE circuit 106 includes P-type transistors. It is to be noted that other types of transistors can be used without deviating from the scope of the present disclosure or that the first FFE circuit 104 includes predominately N-type transistors, while the second FFE circuit 106 includes predominately P-type transistors. The receiver 102 is configured to provide the differential signal to the first FFE circuit 104 based on the differential signal having a high common mode voltage. In contrast, the receiver 102 is configured to provide the differential signal to the second FFE circuit 106 based on the differential signal having a low common mode voltage.

The receiver 102 further includes a decision circuit 108, which will be discussed in more detail with reference to FIG. 4. In various embodiments, the decision circuit 108 is a comparator configured to determine the common mode voltage of a propagated differential signal transmitted over traces 123 and 124. The decision circuit 108 exhibits hysteresis that allows the decision circuit to retain its output while the system experiences common mode variation and ground shift between the driver 122 and the receiver 102. The decision circuit 108 functions to provide the differential signal to either first FFE circuit 104 or the second FFE circuit 106 by enabling one of the first FFE circuit 104 or the second FFE circuit 106. In an embodiment, the first FFE circuit 104 or the second FFE circuit 106 is selectively enabled using, for example, a switch 120, which will be discussed more thoroughly with respect to the remaining Figs. Additionally, it is noted that while only two FFE circuits 104, 106 are illustrated, suitably in other embodiments, more FFE circuits are utilized without departing from the scope of this disclosure.

Figure 2:
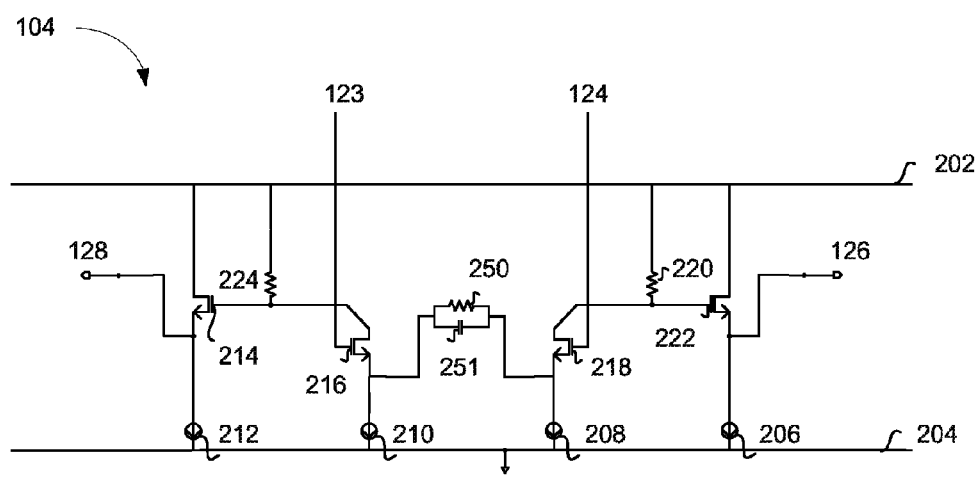
FIG. 2 illustrates a circuit diagram of a feed forward equalizing circuit, in accordance with various embodiments.
Figure 3:
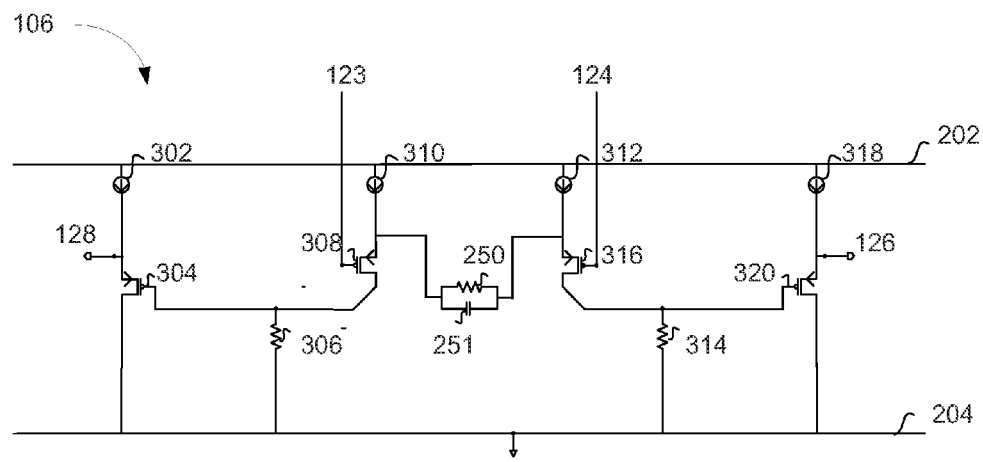
FIG. 3 illustrates a circuit diagram of a feed forward equalizing circuit, in accordance with various embodiments.

Referring to FIGS. 2 and 3, FFE circuits are illustrated in accordance with an embodiment. The FFE circuit 104 of FIG. 2 corresponds to the first FFE circuit 104 of FIG. 1, and the FFE circuit 106 corresponds to the second FFE circuit 106 of FIG. 1. The FFE circuit 104 includes a plurality of N-type transistors 214, 216, 218 and 222, and the FFE circuit 106 includes a plurality of P-type transistors 304, 308, 316, and 320. In an embodiment, the transistors, whether for FFE circuit 104 or FFE circuit 106, are field effect transistors (FETs) or any other type of suitable transistor known in the art. The FFE circuit 104 is configured to handle high common mode voltage received from driver 122, and the FFE circuit 106 is configured to handle low common mode voltage received from driver 122. In addition, the FFE circuits 104 and 106 include a number of current sinks and sources, and are configured to provide outputs 128 and 126.

As illustrated in FIGS. 2 and 3, and as will be discussed below with reference to FIG. 4, the first FFE circuit 104 shares a resistor-capacitor (RC) network with the second FFE circuit 106. The shared RC network, comprising resistor 250 and capacitor 251, acts as a high pass filter. The RC network is isolated from one of the FFE circuits during operation. The isolation of the first FFE circuit 104 from FFE circuit 106, as an example, is based on the use of one or more controllable switches, which are illustrated in FIG. 4.

Figure 4:
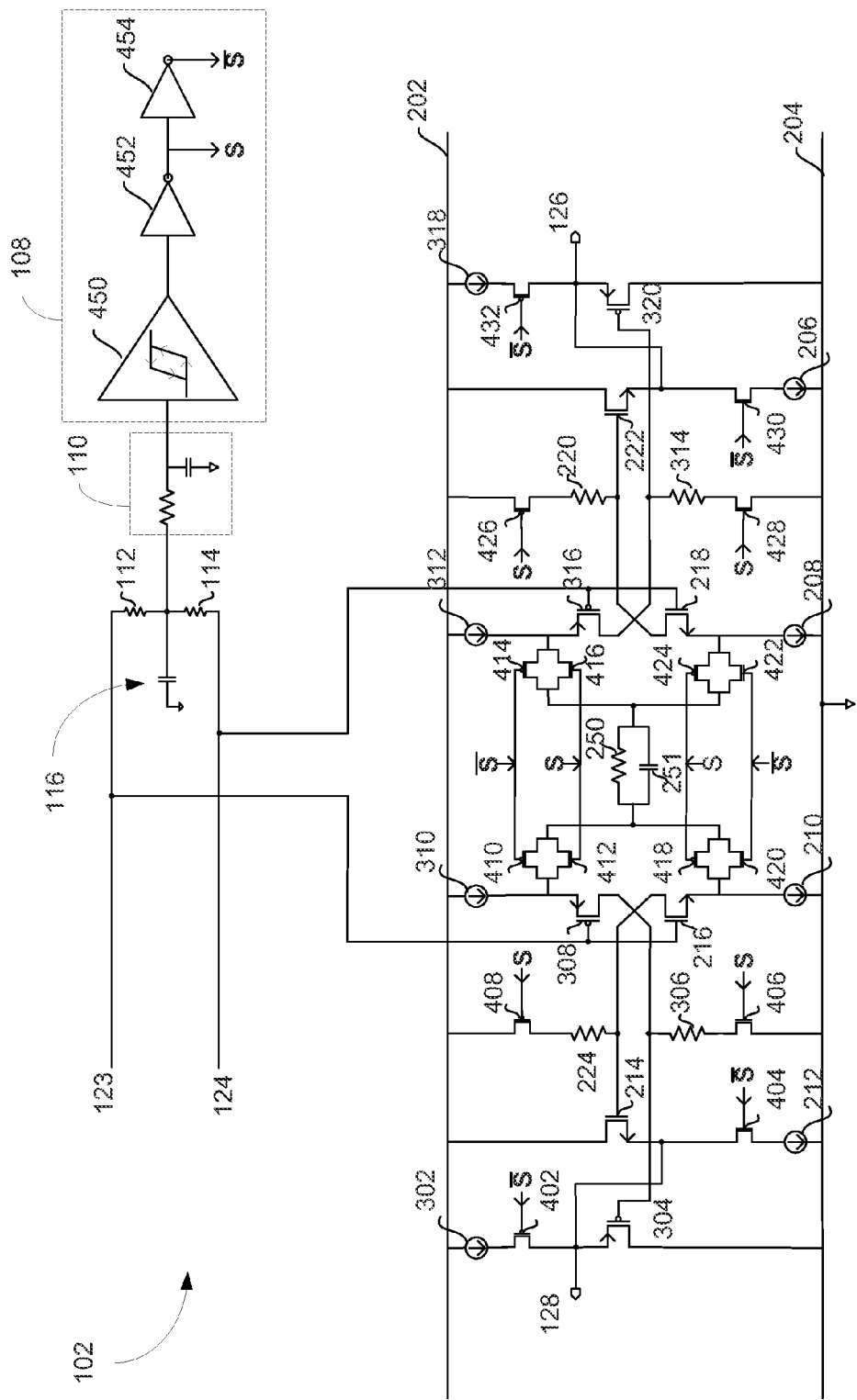
FIG. 4 illustrates a circuit diagram of a variable common mode system, in accordance with various embodiments.

Referring to FIG. 4, an embodiment of an integrated circuit 102 is illustrated in accordance with various embodiments. The integrated circuit 102 includes receiver inputs 123 and 124, termination resistors 112, 114, a common mode AC coupling capacitor 116, a low pass RC filter 110, a decision block 108 including a comparator 450 and inverters 452 and 454 and FFE circuits 104 and 106, which are illustrated in a merged form. The FFE circuits 104 and 106 further include FFE current sinks and sources and a plurality of either N-type or P-type transistors, the transistors acting as passive load components, switches, and output buffers (as illustrated in FIGS. 2 and 3).

The integrated circuit 102 is a receiver having two inputs 123 and 124. The two inputs 123 and 124 are the differential pair received from the driver 122, as illustrated with reference to FIG. 1. The two inputs 123 and 124 are coupled to termination resistors 112, 114. The termination resistors 112, 114 are typically 50 ohms, in an embodiment. However, it is to be noted that other resistances can also be used without deviating from the scope of the present disclosure. Coupled to a node between termination resistors 112, 114, is a common mode alternating current (AC) capacitor 116 that is configured to reduce a common mode return loss.

In the embodiment illustrated, the FFE circuits 104 and 106 are merged into a single circuit which utilizes controllable switches 402-432 to isolate the first FFE 104 from the second FFE 106. In the merged circuit, the first FFE circuit 104 is configured to operate based on receipt of a first common mode voltage. The first FFE circuit 104 is coupled to the second FFE circuit 106, which is configured to operate based on receipt of a second common mode voltage that is different than the first common mode voltage. Dependent upon the received common mode voltage, either the first FFE circuit 104 will be coupled to a resistor-capacitor network comprised of resistor 250 and capacitor 251, or the second FFE circuit 106 will be coupled to the RC network comprised of resistor 250 and capacitor 251. By coupling the first FFE circuit 104 and the second FFE circuit 106, via controllable switches 402-432, to the same RC network, the need for multiple RC networks is reduced. The RC network acts as an FFE high pass circuit, and the plurality of controllable switches 402-432 are configured to enable both the first FFE circuit 104 and the second FFE circuit 106 to utilize the RC network. In an embodiment, the controllable switches 402-432 comprise a plurality of both N-type FETs and P-type FETs.

The decision circuit 108 of FIG. 1 is illustrated in FIG. 4 as including comparator 450 and inverters 452, 454. The comparator 450, in various embodiments, exhibits hysteresis. The inverted 454 and non-inverted 452 outputs, as described previously, work cooperatively with the controllable switches 402-432 to provide either the first common mode voltage the first FFE circuit 104 or the second common mode voltage to the second FFE 106. In this manner, a receiver integrated circuit 102 is configured to process a differential signal transmitted from a driver 122 over traces 123 and 124 without having prior knowledge of the common mode voltage associated with the driver 122.

Figure 5:
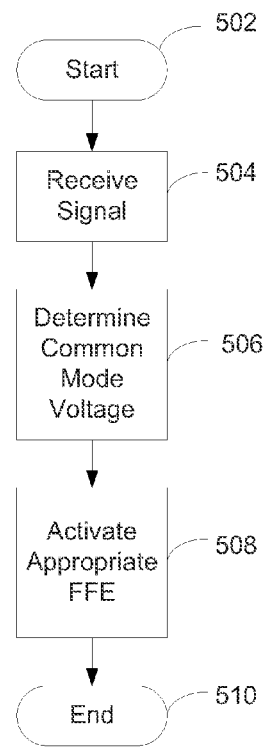
FIG. 5 illustrates a flow diagram associated with a variable common mode system, in accordance with various embodiments.

Referring to FIG. 5 a flow diagram associated with a variable common mode system is illustrated in accordance with various embodiments. The method begins at 502 and progresses to 504 where the integrated circuit, such as integrated circuit 102 of FIGS. 1-4, receives a differential signal. In an embodiment, the differential signal is a high speed differential signal that propagates from a driver 122 to the receiver 102 and is terminated with termination resistors 112, 114 (which are, for example, 50 Ohms each, although other resistance values are also possible). The termination resistors 112, 114, in various embodiments, are calibrated to reach this value. The propagated differential signal has an unknown common mode voltage with respect to the receiver 102. In various embodiments, the common mode voltage is unknown, for example, due to the receiver 102 and driver 122 being produced by different manufacturers.

Although not illustrated in FIG. 5, in an embodiment, upon receipt by the termination resistors 112,114, the common mode voltage is filtered using a low pass filter 110. The filtered common mode voltage is then connected to a decision circuit 108 (which includes, for example, the comparator 450), where a determination of the common mode voltage is made at 506. The decision circuit 108 exhibits hysteresis such that it enables the comparator 450 to retain its output while the system experiences common mode variation and ground shift between the driver 122 and the receiver 102. The comparator 450 determines an output based on two threshold values around a midpoint of the voltage difference between the two differential pair inputs 123, 124. The determination is made by generating a first output and a second output, wherein the first output and the second output are configured to cooperatively activate either the first FFE circuit 104 or the second FFE circuit 106.

Subsequent to the determination made at 506, the method progresses to 508 where the integrated circuit 102 activates either the first FFE circuit 104 or the second FFE circuit 106. In the case where the common mode voltage dictated by the driver 122 is bigger than a reference voltage, the output of the comparator 450 will effectively turn on the first FFE circuit 104, while turning off the second FFE circuit 106. In contrast, in the case where the common mode voltage dictated by the driver is smaller than a reference voltage, the output of the comparator will turn on the second FFE circuit 106, while turning off the first FFE circuit 104. To turn on and off various ones of the FFE circuits 104 and 106, the decision circuit 108 controls one or more controllable switches 402-432 to couple either the first FFE circuit 104 to a resistor-capacitor (RC) network 250, 251 or the second FFE circuit 106 to the RC network 250, 251. Subsequent to the activation of the appropriate FFE 508, the method ends at 510.

Although certain embodiments have been illustrated and described herein, it will be appreciated by those of ordinary skill in the art that a wide variety of alternate and/or equivalent embodiments or implementations calculated to achieve the same purposes can be substituted for the embodiments shown and described without departing from the scope. It is noted that embodiments can be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. An integrated circuit, comprising:
   a first feed forward equalizing (FFE) circuit configured to operate based on receipt of a first common mode voltage;
   a second FFE circuit coupled to the first FFE circuit, the second FFE circuit configured to operate based on receipt of a second common mode voltage that is different than the first common mode voltage; and
   a decision circuit coupled to both the first FFE circuit and the second FFE circuit, the decision circuit configured to selectively provide the first common mode voltage to the first FFE circuit or the second common mode voltage to the second FFE circuit.

2. The integrated circuit of claim 1, wherein the decision circuit comprises:
   a comparator having hysteresis.

3. The integrated circuit of claim 1, wherein the first FFE circuit comprises:
   a plurality of N-type transistors.

4. The integrated circuit of claim 1, wherein the second FFE circuit comprises:
   a plurality of P-type transistors.

5. The integrated circuit of claim 1, further comprising:
   a resistor capacitor (RC) network configured to operate as a high pass filter; and
   a plurality of controllable switches configured to selectively couple the first FFE circuit and the second FFE circuit to the RC network.

6. The integrated circuit of claim 5, wherein the plurality of controllable switches are further configured to:
   couple the first FFE circuit to the RC network based on the receipt of the first common mode voltage; and
   couple the second FFE circuit to the RC network based on the receipt of the second common mode voltage.

7. The integrated circuit of claim 1, further comprising:
   a first output buffer coupled to the first FFE circuit and a second output buffer coupled to the second FFE circuit.

8. A method, comprising:
   receiving, by an integrated circuit, a differential signal, wherein the differential signal has an unknown common mode voltage;
   determining, by the integrated circuit, the common mode voltage of the differential signal; and
   selectively activating, based on the determining by the integrated circuit, either a first feed forward equalizing (FFE) circuit associated with a first common mode voltage or a second FFE circuit associated with a second common mode voltage that is different than the first common mode voltage.

9. The method of claim 8, wherein determining the common mode voltage comprises:
   filtering an average of the differential signal to determine the common mode voltage.

10. The method of claim 8, wherein determining the common mode voltage further comprises:
comparing the common mode voltage with one or more thresholds via a comparator;
wherein the comparator is configured to retain the common mode voltage.

11. The method of claim 8, wherein determining the common mode voltage further comprises:
generating a first output and a second output, wherein the first output and the second output are configured to activate either the first FFE circuit or the second FFE circuit.

12. The method of claim 8, wherein activating either the first FFE circuit or the second FFE circuit comprises:
controlling one or more switches to couple either the first FFE circuit to a resistor capacitor (RC) network or the second FFE circuit to the RC network.

13. The method of claim 8, wherein activating either the first FFE circuit or the second FFE circuit comprises:
activating the first FFE circuit in response to determining the common mode voltage, wherein the first FFE circuit comprises N-type transistors.

14. The method of claim 8, wherein activating either the first FFE or the second FFE comprises:
activating the second FFE circuit in response to determining the common mode voltage, wherein the second FFE comprises P-type transistors.

15. A system, comprising:
a driver configured to transmit a differential signal, wherein the differential signal has a common mode voltage; and
a receiver coupled to the driver, wherein the receiver is configured to determine the common mode voltage of the differential signal and provide the differential signal to one of a first feed forward equalizer (FFE) circuit or a second FFE circuit.

16. The system of claim 15, wherein:
the first FFE circuit only includes transistors that are N-type transistors; and
the second FFE circuit only includes transistors that are P-type transistors.

17. The system of claim 15, wherein the receiver comprises:
a comparator configured to determine the common mode voltage.

18. The system of claim 15, wherein the receiver comprises:
a resistor capacitor (RC) network coupled to both the first FFE circuit and the second FFE circuit.

19. The system of claim 18, wherein the receiver comprises:
a plurality of controllable switches configured to selectively couple the first FFE circuit to the RC network and the second FFE circuit to the RC network.

20. The system of claim 15, wherein the receiver comprises:
a plurality of output buffers.

* * * * *